(12) United States Patent
Young

(10) Patent No.: US 9,124,171 B2
(45) Date of Patent: Sep. 1, 2015

(54) ADAPTIVE CURRENT LIMITER AND DIMMER SYSTEM INCLUDING THE SAME

(76) Inventor: James Roy Young, Tucson, AZ (US)

(*) Notice: Subject to any disclaimer, the term of this patent is extended or adjusted under 35 U.S.C. 154(b) by 582 days.

(21) Appl. No.: 12/845,091

(22) Filed: Jul. 28, 2010

(65) Prior Publication Data

US 2012/0026761 A1 Feb. 2, 2012

(51) Int. Cl.
*H02M 1/12* (2006.01)
*H02M 7/12* (2006.01)
*H05B 33/08* (2006.01)
*H02M 1/44* (2007.01)
*H02M 1/00* (2007.01)

(52) U.S. Cl.
CPC ............... *H02M 7/125* (2013.01); *H02M 1/12* (2013.01); *H05B 33/0887* (2013.01); *H02M 1/44* (2013.01); *H02M 2001/0045* (2013.01)

(58) Field of Classification Search
USPC ......... 323/271, 285, 908, 317, 237, 266, 212, 323/217; 363/44, 21.14, 97, 21.12, 21.15, 363/19, 22, 15, 16, 21.01, 21.02, 50, 52, 363/53; 361/93.9; 315/224
See application file for complete search history.

(56) References Cited

U.S. PATENT DOCUMENTS

| 4,779,062 | A | | 10/1988 | Scheraga | |
|---|---|---|---|---|---|
| 4,999,566 | A | * | 3/1991 | Kuekn | 323/222 |
| 5,786,685 | A | * | 7/1998 | Lange | 323/270 |
| 6,128,205 | A | * | 10/2000 | Bernd | 363/89 |
| 6,225,759 | B1 | * | 5/2001 | Bogdan et al. | 315/291 |
| 6,504,733 | B1 | * | 1/2003 | Watson | 363/19 |
| 7,336,508 | B2 | * | 2/2008 | Nakamura | 363/21.15 |
| 7,639,517 | B2 | * | 12/2009 | Zhou | 363/21.17 |
| 7,679,936 | B2 | * | 3/2010 | Huynh et al. | 363/16 |
| 8,558,474 | B1 | * | 10/2013 | Zhang et al. | 315/247 |
| 2003/0127997 | A1 | * | 7/2003 | Shoji et al. | 315/291 |
| 2005/0275354 | A1 | * | 12/2005 | Hausman et al. | 315/291 |
| 2007/0182347 | A1 | * | 8/2007 | Shteynberg et al. | 315/312 |
| 2007/0285028 | A1 | * | 12/2007 | Tsinker et al. | 315/224 |
| 2008/0258647 | A1 | * | 10/2008 | Scianna | 315/291 |
| 2008/0259652 | A1 | * | 10/2008 | Huynh | 363/21.12 |
| 2009/0219005 | A1 | * | 9/2009 | Salvestrini | 323/299 |
| 2009/0243582 | A1 | * | 10/2009 | Irissou et al. | 323/320 |
| 2010/0213859 | A1 | * | 8/2010 | Shteynberg et al. | 315/224 |

(Continued)

OTHER PUBLICATIONS

Applications Engineering Department, Reference Design Report for a High Efficiency (>81%), High Power Factor (>0.9%) TRIAC Dimmable 7 Wtyp LED Driver Using LinkSwitch-PH LNK403EG, Publication, Jun. 9, 2010, 39 pages, Document No. RDR-193, Power Integrations, Inc., San Jose, California.

(Continued)

*Primary Examiner* — Matthew Nguyen
*Assistant Examiner* — Trinh Dang
(74) *Attorney, Agent, or Firm* — Polansky & Associates, P.L.L.C.

(57) ABSTRACT

In an embodiment, an adaptive current limiter includes a sense element, a current pass element, and a controller. The sense element includes a first sense terminal coupled to a power supply terminal and a second sense terminal. The sense element generates a sense voltage in response to a feedback current. The current pass element includes a first terminal for receiving the feedback current, a second terminal coupled to the second sense terminal, and a control terminal. The controller is coupled to the sense element and to the control terminal for adjusting the feedback current conducted by the current pass element based on the sense voltage and a time-varying voltage signal.

20 Claims, 4 Drawing Sheets

(56) References Cited

U.S. PATENT DOCUMENTS

2011/0080110 A1* 4/2011 Nuhfer et al. .................. 315/291
2011/0194311 A1* 8/2011 Gaknoki et al. ........... 363/21.12

OTHER PUBLICATIONS

National Semiconductor Corporation, TRIAC Dimmable Offline LED Driver, Publication, Feb. 19, 2010, 26 pages, Issue No. LM3445, National Semiconductor Corporation, Santa Clara, California.

Jim Young, 90-135 Vac Up to 15 Watt Dimmable LED Driver Demo Board Operation, Publication, Jan. 2010, 10 pages, Publication No. NCL30000LED1GEVB/D, Semiconductor Components Industries, LLC, Austin, Texas.

Jim Young, Configuring the NCL30000 for TRIAC Dimming, Publication, Dec. 2009, 9 pages, Publication No. AND8448/D, Semiconductor Components Industries, LLC, Austin, Texas.

NXP Semiconductors, SMPS IC for Dimmable Lighting, Product Data Sheet, Aug. 28, 2009, 23 Pages, Document No. SSL2101_4, NXP Semiconductors, Eindhoven, Netherlands.

How a Dimmer Works, I Light (ilightgroup.com), Literature Download, No Date Given, 4 Pages, No Volume Issue Number Given, I Light for Cooper Controls, Ltd, Peachtree City, Georgia. Headquarters in Kent, UK.

* cited by examiner

ADAPTIVE CURRENT LIMITER AND DIMMER SYSTEM INCLUDING THE SAME

FIELD

The present disclosure is generally related to current limiter circuits, and more particularly to an adaptive current limiter suitable for use in a phase-cut dimmer circuit having electromagnetic interference (EMI) filter circuitry.

BACKGROUND

An incandescent lamp is dimmed when it operates at a lower voltage than the nominal voltage for which it was designed. As an applied voltage decreases, lamp power and lumens also decrease accordingly. Conventionally, dimmers are solid-state switching devices that turn the light on and off at a rate that is related to the frequency of the applied power source. In the United States, standard alternating current (AC) power supply voltages oscillate at a rate of 60 times per second (or 60 Hertz), so the dimmer circuits are designed to turn the light on and off at a rate of twice the supply frequency (i.e., a frequency of 120 Hertz). The combined thermal mass and the resistance of the filament of the incandescent lamp smoothes out the pulses. Since the brightness at which the filament glows depends on the amount of current flowing through the filament, the human eye sees a brighter or dimmer light, depending on the proportion of on-time relative to off-time. In other words, the input voltage is turned on at a point in the phase, reducing the average voltage delivered to the bulb, which is called phase-cut dimming.

There are two types of phase-cut dimming: forward phase-cut dimming and reverse phase-cut dimming. In forward phase-cut dimming, a circuit controls the power supplied to the lamp so that the lamp is energized during the last portion of each power-line half cycle. Such forward phase-cut dimming circuits are inexpensive, relatively robust, and suitable for most load circuits, including regular incandescent lamps and magnetic transformers, as well as neon, cold cathode, and some types of fluorescent dimming ballasts. In reverse phase-cut dimming, a circuit controls power to the lamp so that the lamp is energized during the initial portion of each power-line half cycle. Reverse phase-cut dimming is typically more expensive because it uses more complex electronics. However, some loads, such as electronic transformers, operate better and make less audible noise (such as buzzing or ringing) when a reverse phase-cut dimmer circuit is used.

In either case, the actual lighting load operates at the power-line frequency. The switching frequency can cause the load circuitry to emit audible noise. Sometimes noise-reduction devices, such as de-buzzing coils, are used to reduce or eliminate the hum that these systems generate.

One type of phase-cut dimmer circuit is called a Triode for Alternating Current (TRIAC) circuit or TRIAC dimmer. TRIAC dimmers can be incorporated into light switches to provide dimming functionality. A TRIAC dimmer controls power to a load (such as the bulb) by gating the applied sinusoidal AC waveform from the current source based on either the forward or reverse type of dimming. In particular, the TRIAC dimmer turns on over a half-cycle of the AC power supply and then turns off at the end of each half-cycle, modulating the power delivered to the load. The on-off cycle of the TRIAC dimmer repeats during operation to drive the load, and the timing of the turn-on of the TRIAC dimmer controls the amount of energy supplied. In general, the TRIAC dimmer delivers a peak power supply to the load when the TRIAC dimmer is configured to turn on at the peak of the AC power supply waveform.

Such TRIAC dimmers are used in many residential, commercial, and industrial settings to provide adjustable lighting. Conventional TRIAC dimmers are designed to control power supplied to a resistive load, such as a standard incandescent or halogen-based lamp. Recent developments in light bulbs, such as compact florescent lamps and light-emitting diode lamps, provide enhanced efficiency and longevity; however, such devices do not necessarily operate as resistive loads from the perspective of a TRIAC dimmer. Accordingly, conventional TRIAC dimmer circuits may not function properly and/or may not work at all with such newer lighting solutions. Instead of dimming the lamp, such TRIAC dimmer circuits may cause the lamp to flicker or may not work at all.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

Embodiments of a system are disclosed below that include an adaptive current limiter configured to limit the abrupt power step from a TRIAC dimmer switch, preventing ringing in an associated EMI filter, and to increase the current limit as a function of time and based on a feedback current from the EMI filter. By limiting the abrupt power step to prevent passage of high rate-of-change signals, the adaptive current limiter provides a more consistent load that maintains proper TRIAC operation even when used in conjunction with LED or other types of lamps that do not present a resistive load to the system. A current signal produced by a conventional TRIAC dimmer system is described below with respect to FIG. 1.

Figure 1:
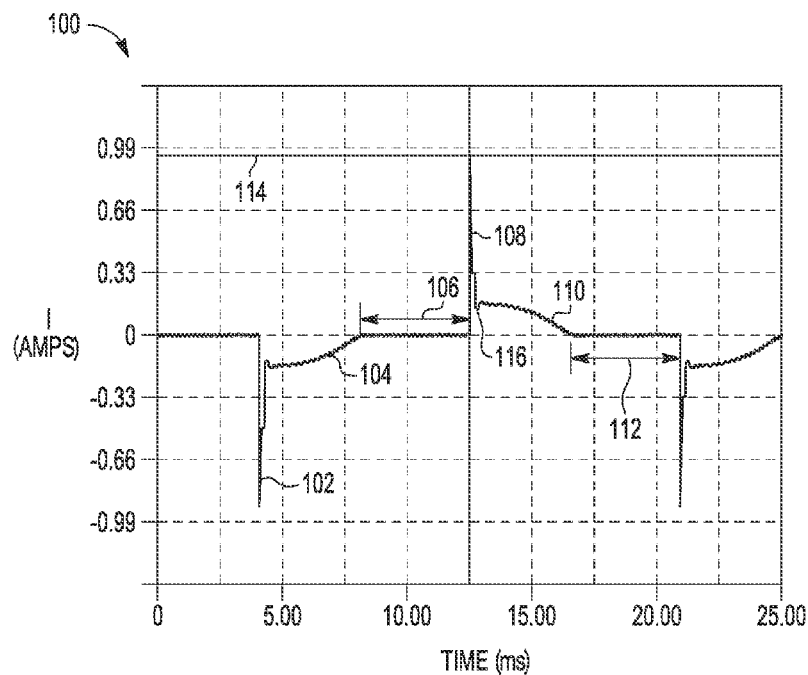
FIG. 1 is a timing diagram of current versus time produced by a conventional TRIAC dimmer connected to the circuit in FIG. 2.

FIG. 1 is a timing diagram 100 of current versus time produced by a conventional phase-cut dimmer system, such as a TRIAC dimmer circuit. Within timing diagram 100, the vertical axis represents the current in Amperes, and the horizontal axis represents time in milliseconds. At 102, the phase-cut dimmer circuit is turned on by the half-cycle of the negative portion of the alternating current (AC) power supply from the power source. The negative current spike at 102 has a peak current of about negative 0.95 Amperes, assuming a particular load. Following the peak current spike, the current level decreases to a level corresponding to an active current draw (generally indicated at 104) for the load circuit. The active current draw level 104 has a current level of approximately negative 0.2 A. The active current draw decreases through the remainder of the quarter-cycle. At 106, the TRIAC dimmer circuit is off during the next quarter-cycle.

A positive current spike at 108 also has a peak of about 0.95 Amps, which is generally indicated by horizontal line 114. Positive current spike 108 is associated with the turning on of the phase-cut dimmer circuit with a half-cycle of a positive portion of the AC power supply. After the positive current spike 108, the current level decreases to an operating current level at 110, which represents a peak current of about 0.2 A and which discharges through the remainder of the half-cycle. At 112, the phase-cut dimmer circuit stays off until the next half-cycle. This signal pattern is repeated indefinitely until the phase-cut dimmer circuit is turned off. The phase-cut dimmer circuit typically includes an adjustment mechanism (such as a slider or other user-accessible element), which is accessible to dim an associated light by altering the amount of time that the phase-cut dimmer circuit is on or off, thereby changing the timing and duration of the output pulses relative to the phases of the AC power supply.

Timing diagram 100 is illustrative of the peak currents, but does not represent the worst case, which occurs at higher voltages, such as at 230 Volts AC and 277 Volts AC, where the peak step voltage can exceed 400 Volts where the current would be significantly higher. Such high peak voltages and associated peak current spikes increase losses and unduly stress circuit elements. Further, such peak currents can resonate between components of an electromagnetic interference (EMI) circuit, such as EMI circuitry, which will be discussed with respect to the system 200 depicted in FIG. 2, resulting in oscillatory currents which can interfere with operation of the phase-cut dimmer circuit. When such oscillating currents are present, insufficient current flow while the phase-cut dimmer circuit is turned on or at any time during a cycle can cause the phase-cut dimmer circuit to turn off unexpectedly.

For example, at the transition between the positive current spike 108 and the operating current level 110, the current can overshoot or undershoot the operating current level 110 (as generally indicated at 116), which overshoot or undershoot can cause the current level to fall below the hold current (i.e., the operating current level 110), causing the switch to turn off unexpectedly. A certain amount of hold current is needed to maintain the phase-cut dimmer circuit in an "on" state to provide proper operation. Oscillating currents can attenuate the current level, causing the current level to fall below the hold current level, turning off the phase-cut dimmer circuit unexpectedly. Such unexpected turning off of the phase-cut dimmer circuit can create flicker in an electronic light (LED or compact fluorescent). One technique for preventing such flicker includes drawing additional current to achieve a hold current level sufficient to keep the phase-cut dimmer circuit from turning off. An embodiment of a conventional circuit configured to maintain the TRIAC dimmer hold current is described below with respect to FIG. 2.

The magnitude of the current spike resulting from the TRIAC turning on is a function of the instantaneous voltage difference between the power source and the capacitors in the system. If the TRIAC is turned on near the beginning or end of the input half cycle the instantaneous voltage difference will be small and consequently the current spike will be lower. A delay period which activates the TRIAC near the peak of the input power waveform introduces a high instantaneous voltage differential resulting in a high amplitude current spike.

Figure 2:
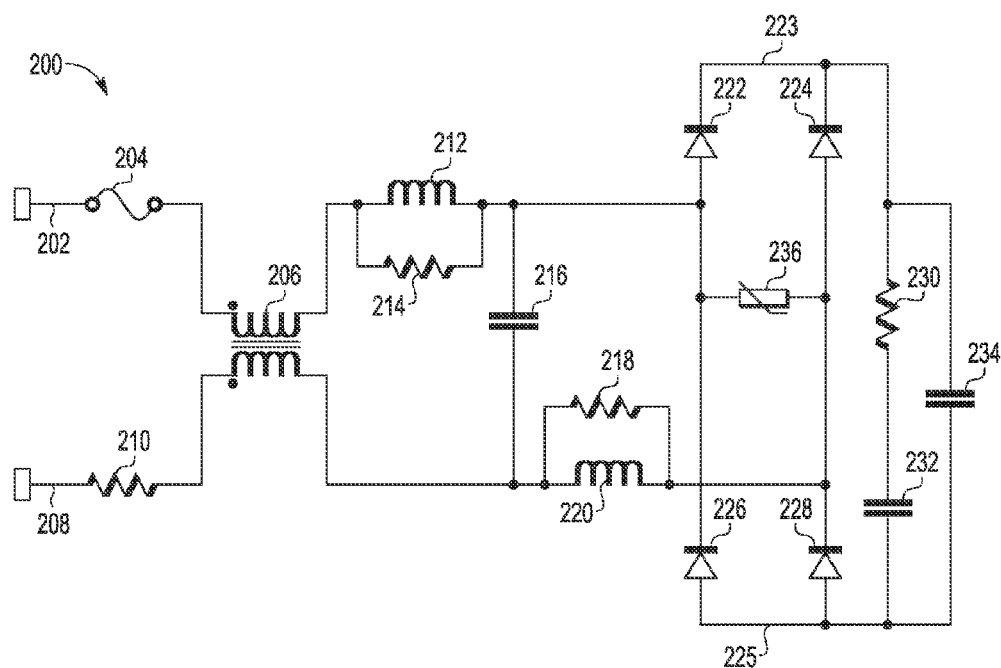
FIG. 2 is a block diagram of a representative example of a system including a conventional electromagnetic interference (EMI) filter circuit for use with a conventional TRIAC dimmer.

FIG. 2 is a block diagram of a representative example of a system 200 including input filter circuitry for providing electromagnetic interference (EMI) filtering between a phase-cut dimmer circuit, such as a TRIAC dimmer circuit, and a resistive load. System 200 includes inputs 202 and 208 for receiving an alternating current from a TRIAC dimmer circuit (not shown). A fuse 204 and a resistor 210 connect inputs 202 and 208, respectively, to a common mode inductor circuit 206.

Common mode inductor circuit 206 includes a first terminal connected to a first terminal of inductor 212 and a first terminal of resistor 214, which are arranged in parallel. The inductor 212 includes a second terminal connected to a first electrode of a capacitor 216. Resistor 214 also includes a second terminal connected to the first electrode of capacitor 216. Common mode inductor circuit 206 further includes a second terminal connected to a second electrode of capacitor 216. The second terminal of common mode inductor circuit 206 is also connected to a first terminal of resistor 218 and to a first terminal of an inductor 220, which are connected in parallel. Resistor 218 includes a second terminal connected to a full-wave rectifier bridge (diode bridge). Inductor 220 also includes a second terminal connected to the full-wave rectifier bridge.

Full-wave rectifier bridge including diodes 222, 224, 226, and 228. Diode 222 includes an anode connected to the second terminals of inductor 212 and resistor 214 and includes a cathode connected to a positive supply terminal 223. Diode 226 includes an anode connected to a negative supply terminal 225 and a cathode connected to the anode of diode 222. Diode 228 includes an anode connected to the negative supply terminal 225 and a cathode connected to the second terminals of resistor 218 and inductor 220. Diode 224 includes an anode connected to the cathode of diode 228 and a cathode connected to the positive supply terminal 223. Additionally, the diode bridge includes a transient voltage surge protector 236 with a first terminal connected to the cathode of diode 226 and the anode of diode 222 and a second terminal connected to the cathode of diode 228 and the anode of diode 224.

System 200 also includes resistor 230 with a first terminal connected to the positive supply terminal 223 and a second terminal connected to an electrode of capacitor 232, which includes a second electrode connected to the negative supply terminal 225. Capacitor 234 includes a first electrode connected to the positive supply terminal 223 and a second electrode connected to the negative supply terminal 225. A voltage potential across capacitor 234 is provided as an output voltage to a load circuit.

In operation, common mode inductor circuitry 206, inductors 212 and 220, resistors 214, 218, and 230, and capacitors 216, 232, and 234 cooperate to provide EMI noise reduction for nearby circuitry. Resistor 210 is selected to limit the peak current, and common mode inductor circuit 206 uses two coupled inductors for EMI filtering and to aid in reducing surge currents. Further, the EMI filter includes a relatively bulky inductive-resistive-capacitive (LRC) filter including resistors 214, 218 and 230 and capacitors 216, 232, and 234 to provide additional holding current to compensate for current ringing and to draw additional holding current to keep a phase-cut dimmer circuit that is connected to inputs 202 and 208 from inadvertently switching off.

The input current from the phase-cut dimmer circuit can include large current spikes at the "turn on" transitions as previously shown in FIG. 1. In some instances, the surge from such current spikes creates audible noise (sometimes referred to as a "hum" or "ringing") from circuit elements. Such noise is undesirable, especially in a quiet residential setting. Further, higher supply voltages exacerbate the current spikes and the associated problem of oscillating currents in the EMI circuitry, particularly for 230 Volt AC and industrial 277 Volt AC environments.

Additionally, excessive current peaks can stress the phase-cut dimmer circuit itself. Such phase-cut dimmer circuits typically have specific current ratings, and unproductive current peaks limit the useful load rating of the phase-cut dimmer circuit. A lower peak current allows more light fixtures to be connected to a phase-cut dimmer circuit. Thus, the high peak currents, which generate oscillations, need to be managed to ensure proper performance, to allow for more light fixtures, and to avoid disruption of the phase-cut dimmer's operation. Reducing the current can also reduce component stress and acoustic noise. An example of a circuit to reduce peak current spikes from such a phase-cut dimmer circuit is described below with respect to FIG. 3.

Figure 3:
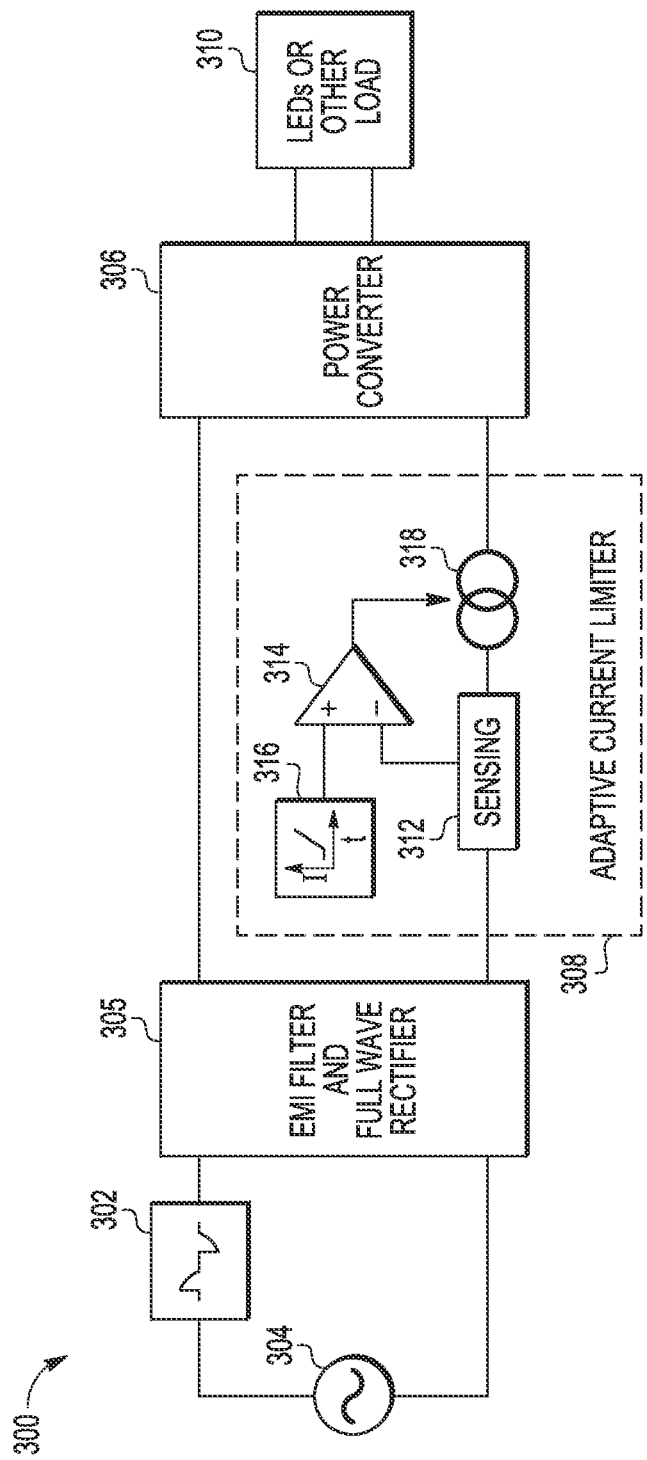
FIG. 3 is a block diagram of an embodiment of a phase-cut dimmer system with an adaptive current limiter.

FIG. 3 is a block diagram of an embodiment of a phase-cut dimmer system 300 including a phase-cut or TRIAC dimmer circuit 302 and an adaptive current limiter 308 configured to provide consistent TRIAC operation for various load circuits. Phase-cut dimmer system 300 includes an AC power supply 304 with a first terminal connected to TRIAC dimmer circuit 302, which has an output connected to a first input of EMI filter and full-wave rectifier 305. AC power supply 304 includes a second terminal connected to a second input of EMI filter and full-wave rectifier 305. EMI filter and full-wave rectifier 305 includes a first terminal connected to a first terminal of a power converter 306 (such as a transformer or a direct-current (DC)-to-DC converter, and associated power control circuitry) and includes a second terminal connected to adaptive current limiter 308. Adaptive current limiter includes a terminal coupled to a second terminal of power converter 306. Power converter 306 includes output terminals connected to LEDs or other load circuit 310, such as an LED lamp, a compact florescent lamp, a motor, or other load circuitry.

In this particular instance, EMI filter and full-wave rectifier 305 includes the diode rectifying bridge including diodes 222, 224, 226, and 228 and transient surge protector 236, depicted in FIG. 2. Further, EMI Filter and full-wave rectifier 305 includes common mode inductor circuit 206, resistors 210 and 218, inductor 220, and capacitors 232 and 234, depicted in FIG. 2. In alternative embodiments, different types of EMI filter circuitry can be used.

Adaptive current limiter 308 includes a current pass element 318 including a first current electrode connected to the second terminal of power converter 306, a second current electrode connected to a first terminal of sensing element 312, and a control electrode. Sensing element 312 includes a second terminal connected to the second terminal of EMI Filter and full-wave rectifier 305. Sensing element 312 provides a sense voltage proportional to current flowing through the sensing element 312 to a negative input of a differential amplifier 314. Differential amplifier 314 includes a positive input connected to a reference generator 316 and an output connected to the control electrode of current pass element 318. Current pass element 318 can be a power field effect transistor (FET) or other device configured to control current flow in response to a control signal.

Reference generator 316 provides a time-varying signal to the positive input of differential amplifier 314. Differential amplifier 314 generates a control signal, which itself is time-varying, in response to receiving the sense voltage and the time-varying signal. The time-varying control signal controls current flowing through the current pass element 318, allowing the current to increase over time in response to the time-varying control signal.

In an example, reference generator 316 can include a capacitor and/or other circuitry configured to automatically generate a time-varying signal over a pre-determined time. In some embodiments, reference generator 316 is programmable, such as by a host system (not shown). In a particular example, reference generator 316 can be implemented by a host system generating the time-varying signal, which can be provided to the positive input of amplifier 314 through a pin connection.

The time-varying signal can be a ramp signal having a substantially linear portion for a pre-determined period of time, can be an exponentially varying signal over a pre-determined time period, or can be some other signal that can be used to increase a current limit over a pre-determined time. The pre-determined time can be configured to correspond to a time of a current spike associated with a turn-on time of an associated phase-cut dimmer circuit. Current-pass element 318 can control the current flow to increase substantially linearly, substantially exponentially, or in another controlled manner, over a pre-determined period of time in response to the time-varying control signal produced by amplifier 314. Amplifier 314 produces the time-varying control signal in response to the time-varying signal from reference generator 316 and in response to the sense voltage from sensing element 312.

In operation, adaptive current limiter 308 limits the power surge created by switching of the TRIAC dimmer circuit 302 to a rate of change that is suitable to energize the EMI filter portion of EMI filter and full-wave rectifier 305 with reduced peak currents. In particular, by controlling or limiting the peak current, adaptive current limiter 308 allows the current to increase at a controlled rate after the TRIAC dimmer circuit 302 turns on, providing time for the EMI filter capacitors to charge, avoiding oscillations from excess stored energy and preventing interference with proper TRIAC operation. Adaptive current limiter 308 gradually increases the current limit as a function of on-time of the feedback current sensed across sensing element 312.

Adaptive current limiter 308 controls current flow through current pass element 318, initially limiting the current flow and gradually increasing the allowed current flow over a pre-determined period of time, avoiding the initial surge and then allowing the full operating current to flow. During the initial surge, adaptive current limiter 308 dissipates the surge energy. The amplitude of the feedback current across sensing element 312 allows charging of the EMI filter circuitry as quickly as possible to minimize power loss. Thus, adaptive current limiter 308 limits the current as a function of the time the feedback current flows across sensing element 312 (i.e., the amount of time that the TRIAC dimmer circuit 302 is on) and as a function of the feedback current flowing through sensing element 312. Accordingly, adaptive current limiter 308 allows the magnitude of the current to vary as a function of time and as a function of the feedback current, substantially independent of the amplitude of the input current. In this way, adaptive current limiter 308 produces a variable current limit, starting with a low limit and gradually increasing, allowing capacitive elements of the EMI filter circuitry of EMI filter and full-wave rectifier 305 to charge at a controlled rate with minimal overcharging.

The time-varying characteristic allows the current to build over time responding to the variable instantaneous voltage difference introduced by the dimmer setting. The current limiter adapts to the magnitude of the voltage difference providing controlled current to charge the capacitors without overcharging which would result in oscillations and interference with proper system operation. A time-varying characteristic matches or adapts to prevailing operating conditions compensating for system load and dimmer setting.

The current limit set by adaptive current limiter 308 will continue to increase after charging of the EMI filter circuitry. Additional current is not forced into the power converter 306, because adaptive current limiter 308 controls the current limit as a function of the feedback current.

Adaptive current limiter 308 limits the peak current during turn on of the TRIAC dimmer circuit 302, reducing peak currents. By the time the turn on event of TRIAC dimmer circuit 302 has passed each half cycle, the adaptive current limiter 308 has increased its limit to a level that is at or above the active current level of load circuit 310 thereby reducing losses. Further, the reference generator 316 and sensing element 312 cooperate to control the rate of current change as a function of the on-time of the TRIAC dimmer circuit 302 and the sense voltage across sensing element 312. Reference generator 316 is reset during the period after the turn on of the TRIAC dimmer circuit 302 in preparation for controlling the rate of current change. Thus, phase-cut dimmer system 300 has current feedback and maintains active control of current flow through current pass element 318 regardless of the magnitude of the AC input voltage.

Adaptive current limiter 308 allows a wide range of load power for a given set of circuit components, making the phase-cut dimmer system 300 tolerant both to power supply variations and to load range variations while limiting current supplied to the power converter 306, which would lead to oscillation and improper TRIAC operation. Such tolerance allows adaptive current limiter 308 to be used with a standard TRIAC dimmer circuit to control LED lamps, compact florescent lamps, and other loads that are non-linear or not purely resistive.

Adaptive current limiter 308 limits the peak current flow into the power converter 306 in response to the turn on of TRIAC dimmer circuit 302 and in response to the feedback current measured by sensing element 312. Adaptive current limiter 308 allows the current flow to increase as a function of the instantaneous voltage difference between the input source and the capacitor voltage and as a function of the feedback current. An example of a circuit to implement the adaptive current limiter 308 is described below with respect to FIG. 4.

Figure 4:
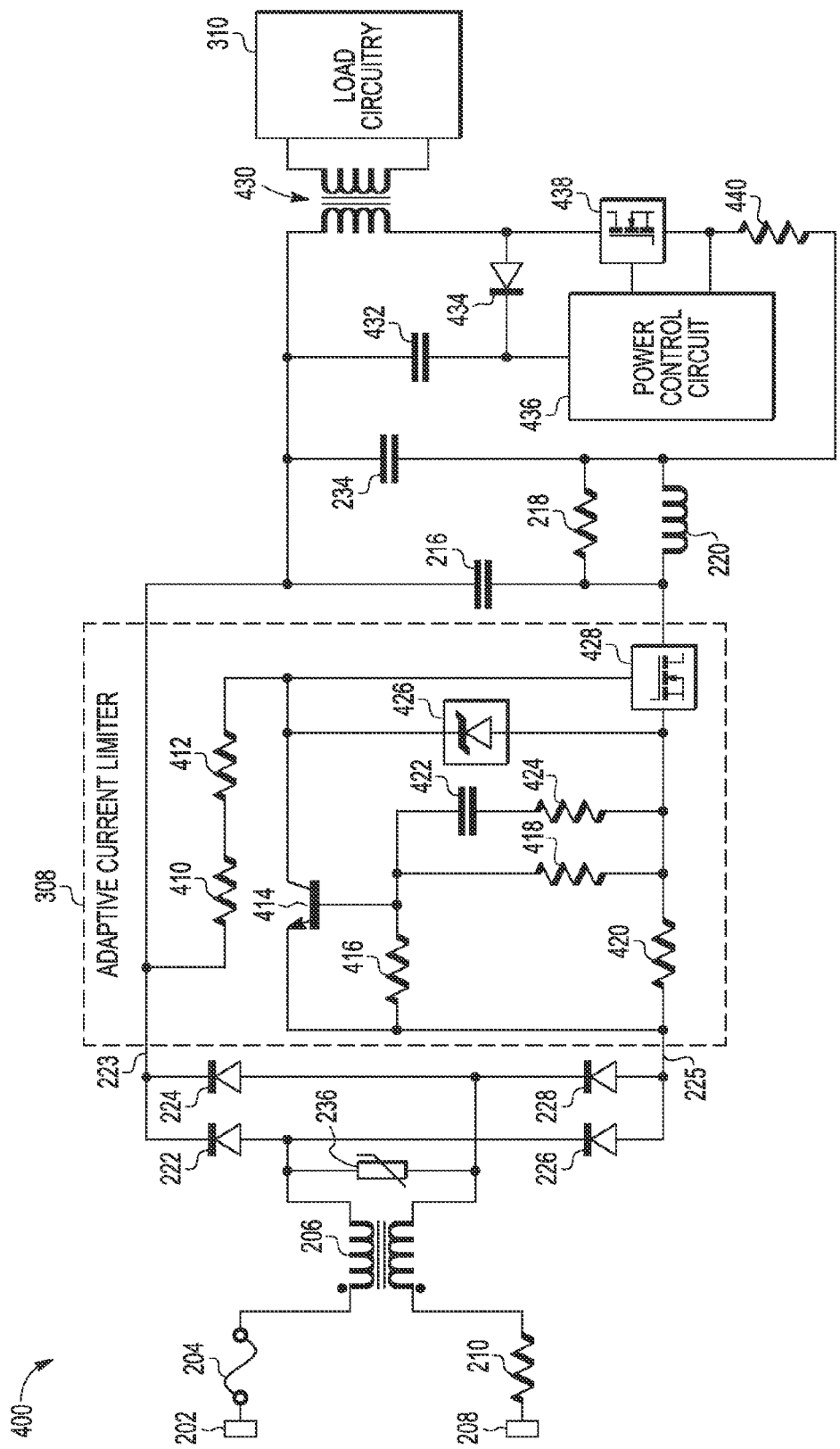
FIG. 4 is a circuit diagram of the phase cut dimmer system of FIG. 3 showing circuit details.

FIG. 4 is a circuit diagram of an embodiment of a system 400 to implement the system of FIG. 3. System 400 includes fuse 204, resistors 210 and 218, common mode inductor circuit 206, inductor 220, transient surge protector 236, diodes 222, 224, 226, and 228, positive and negative supply terminals 223 and 225, and capacitors 232 and 234 as depicted in FIG. 2. Unlike the system 200 depicted in FIG. 2, system 400 includes additional circuit implementation details of adaptive current limiter 308. As compared the system 200 in FIG. 2, in system 400, inductor 212, resistors 214 and 230, and capacitor 232 are omitted.

In the illustrated embodiment, diodes 222, 224, 226, and 228 cooperate to provide a rectified power supply to positive and negative supply terminals 223 and 225. Further, adaptive current limiter 308 includes resistors 410 and 412 connected in series between the positive supply terminal 223 and a collector of a bipolar junction transistor (BJT) 414. Resistors 410 and 412 form a bias circuit for connecting a gate of a field effect transistor (FET) 428 to the positive supply terminal 223. Further, a zener diode 426 includes an anode connected to a source of FET 428 and a cathode connected to gate of FET 428. In some embodiments, an avalanche diode or breakdown diode may be used in place of zener diode 426. FET 428 further includes a drain connected to resistor 218 and inductor 220 and a source connected to a first terminal of sense resistor 420, which has a second terminal connected to negative power supply terminal 225. Resistors 418 and 416 form a voltage divider circuit across the sense resistor 420 and provide the divided sense voltage to the base of BJT 414, which has an emitter connected to the negative supply terminal 225.

It should be appreciated that, in the illustrated embodiment, FET 428 is an N-channel MOSFET. However, in other embodiments, another type of transistor (such as P-channel MOSFET or a BJT) may be used in place of the FET 428 or in place of BJT 414. The term "current electrode" is used to refer to a current conducting electrode of a transistor, such as a collector or an emitter of a BJT or a source or a drain of a FET. The gate or base of a FET or BJT, respectively, which may conduct a small amount of current, is referred to as a "control electrode."

The positive power supply terminal 223 provides power to load circuit 310 through an isolation circuit, such as transformer circuit 430. Capacitor 432 includes a first electrode connected to positive power supply terminal 223 and a second electrode connected to power control circuit 436. A power FET 438 includes a drain connected to a primary winding of isolation transformer circuit 430, a gate connected to power control circuit 436, and a source connected to a sense resistor 440, which is connected to inductor 220. Power control circuit 436 is also connected to sense resistor 440 to detect a sense voltage related to the current flowing through a primary winding of isolation transformer circuit 430 and to control current flow through the primary winding by controlling a voltage applied to the gate of power FET 438. The primary winding of isolation transformer circuit 430 is inductively coupled to a secondary winding including output terminals connected to load circuit 310.

In the illustrated embodiment, FET 428 controls the feedback current flow through adaptive current limiter 308 to the negative power supply terminal 225. FET 428 provides a secondary control for current flow into capacitors 216 and 234, which provide EMI filtering, to limit the current surge generated by the TRIAC dimmer circuit 302.

In operation, resistors 410 and 412 draw a small amount of current from positive supply terminal 223 to drive the gate of FET 428, allowing current flow through FET 428 when the phase-cut dimmer circuit (such as TRIAC dimmer circuit 302) is in an off state. This small current can be used by the phase-cut dimmer circuit to manage its on/off timing. As the current increases (such as when the phase-cut dimmer circuit switches on), current flows across resistor 424 and charges capacitor 422, causing BJT 414 to turn on, pulling the voltage on the gate of FET 428 low, reducing drain-to-source current flow through FET 428. As the capacitor charges, current flow to capacitor 422 decreases, and the base voltage of BJT 414 decreases, allowing the voltage on the gate of FET 428 to increase over time, thereby increasing the current limit of FET 428. In an example, when the voltage at the base of BJT 414 reaches approximately 0.65 volts, BJT 414 turns on and conducts current, reducing the voltage on the gate of FET 428. The reduced voltage on the gate of FET 428 reduces current flow from drain to source through FET 428 to a controlled current level.

Resistor 424 and capacitor 422 form a time-dependent network that bypasses resistor 418 for a pre-determined period of time. When the current limiter is first activated and capacitor 422 is discharged, resistor 424 appears directly in parallel with resistor 418, increasing current flow through resistor 416 and thereby turning on BJT 414 and lowering the effective current limit point. As the capacitor 422 charges, the current level decreases, reducing current flow through BJT 414, and allowing a current limit through FET 428 to increase over time. During operation, the voltage on the base of BJT 414 can reach an equilibrium point at which a current limit of FET 428 is set until the phase-cut dimmer turns off. During the turn off phase, capacitor 422 discharges, resetting the timing. In an embodiment, the values of the resistor 424 and capacitor 422 are selected to achieve a time constant that allows the current limit to increase over time at a controlled rate so as to not overdrive the input filter. Zener diode 426 acts as a limiter for the gate to source voltage of FET 428, clamping the gate voltage at a voltage level corresponding to the breakdown voltage of the zener diode 426. The maximum voltage (i.e., the breakdown voltage of zener diode 426) is set high enough to allow FET 428 to turn on fully, but not so high as to take excessive time for BJT 414 to gain control after the TRIAC dimmer turns off and then turns on again during the next input half cycle.

In a particular embodiment, resistor 210 has a resistance of approximately 2.2Ω and fuse 204 has a current limit of one Ampere. In this embodiment, resistors 410 and 412 have resistances of approximately 62 kΩ, resistor 218 has a resistance of approximately 5.6 kΩ, and capacitors 216 and 234 have capacitances of approximately F 100 nF. Further, in this embodiment, zener diode 426 has a breakdown voltage of approximately 9.1 Volts, resistor 418 has a resistance of 10 kΩ and sense resistor 420 has a resistance of 10 Ω, and resistor 416 has a resistance of approximately 2.7 kΩ. Further, resistor 424 has a resistance of 270Ω and capacitor 422 has a capacitance of approximately 47 nF.

In this particular configuration, BJT 414 will be biased in the active region when the line current reaches approximately 0.3 Amps. Resistor 424 and capacitor 422 form a time-dependent network bypassing resistor 418. When the current limiter is first activated and capacitor 422 is discharged, resistor 424 appears in parallel with resistor 418, reducing the current limit to approximately 0.066 Amps such that a low current of approximately 0.066 Amps is sufficient to activate BJT 414, controlling the voltage on the gate of FET 428. The current limit level rises over time to approximately 0.3 Amps as capacitor 422 charges. In particular, as the capacitor 422 charges, the voltage on the base of BJT 414 increases across resistors 418 and 416, turning on collector-to-emitter current flow. Thus, capacitor 422 charges according to the time constant, increasing the impedance associated with the time-dependent network over time, and varying the current across resistor 416 over time, thereby changing the current in the base of BJT 414. The resistance and capacitance values of resistor 424 and capacitor 422 can be selected to produce a time constant that is configured to slowly increase the current flow to allow time for charging of the EMI filter circuitry (i.e., common mode inductor circuit 206, capacitors 216 and 234, resistor 218, and inductor 220) and to avoid overdriving the EMI filter circuitry.

Thus, system 400 limits the current to reduce the peak current amplitude during the turn-on portion of the TRIAC dimmer cycle. Further, system 400 maintains the operating current draw at a level sufficient to drive associated load circuitry during the remaining half-cycle, and resets to operate during a next half-cycle as described below with respect to FIG. 5.

Figure 5:
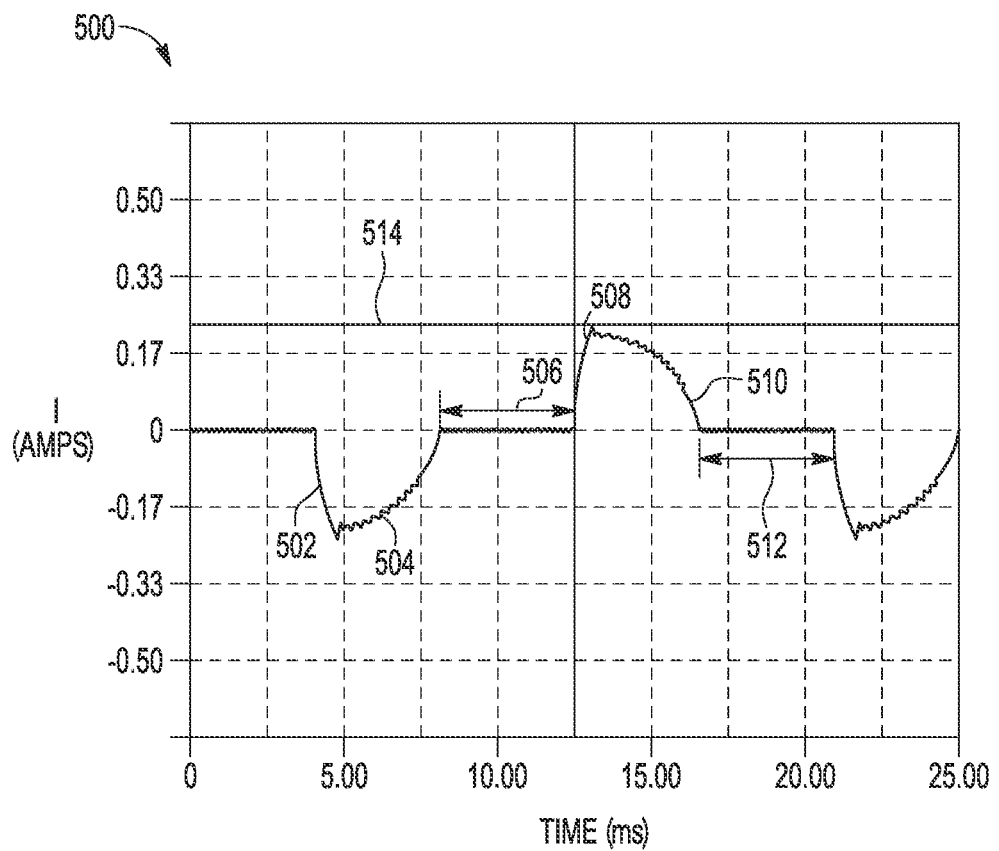
FIG. 5 is a timing diagram of current versus time for the phase-cut dimmer system of FIG. 4.

FIG. 5 is a timing diagram 500 of current versus time for the system 400 depicted in FIG. 4. As compared to the timing diagram 100 in FIG. 1, the scale of the vertical axis is changed to provide greater resolution. At 502, when the phase-cut dimmer turns on, the current rapidly decreases to a negative peak current of approximately negative 0.20 A, which is less than one-fourth of the negative current spike 102 (negative 0.95 Amps) of timing diagram 100 depicted in FIG. 1. The current then gradually increases (as generally indicated at 504) according the operating current drawn by the associated load circuit. During a period indicated at 506, the phase-cut dimmer is off and adaptive current limiter 308 is reset. At 508, the phase-cut dimmer turns on again, and the current level increases to a peak of approximately 0.20 A (as generally indicated by line 514), followed by a discharge period at 510, and then followed by the phase-cut dimmer off period at 512. The cycle then repeats.

As previously discussed, the negative current spike 102 and positive current spike 108 in FIG. 1 represent non-productive portions of the phase-cut dimmer power cycle. As depicted in FIG. 5, system 400 of FIG. 4 substantially eliminates the current spikes by ramping the current limit over a pre-determined period of time that corresponds to the turn-on phase of the phase-cut dimmer circuit. By adaptively changing the current limit as a function of time and as a function of the feedback current across sense resistor 420, the peak current is limited to a level that is approximately equal to the operating current level (i.e., about 0.20 A). Thus, adaptive current limiter 308 substantially eliminates the non-productive portions of the phase-cut dimmer power cycle, reducing power dissipation and stress on the phase-cut dimmer circuit and other associated circuitry and substantially reducing current oscillations that can cause the current level to fall below the hold current of the phase-cut dimmer circuit, causing the phase-cut dimmer circuit to turn off unexpectedly.

Adaptive current limiter 308 can be used for dimming LED lamps. In particular, because of the reduced size, adaptive current limiter 308 can be useful in LED replacement bulb applications where space is at a premium. Further, adaptive current limiter 308 can be used in conjunction with other circuits, such as snubber circuitry and over-voltage or over-current protection circuitry, to suppress transient power events while protecting associated circuitry.

While adaptive current limiter 308 is depicted using discrete components, it should be appreciated that adaptive current limiter 308 can be implemented on a single or multiple die. Further, in some embodiments, adaptive current limiter 308 includes analog control circuitry, such as current mirrors, voltage offsets, or other circuits configured provide the same functionality at lower sensing voltages (such as between 100-300 mV instead of 650 mV). At lower sensing voltages, circuitry can be introduced to further reduce switching-induced power dissipation.

In a particular embodiment, the FET 428 and sense resistor 420 is external to the adaptive current limiter 308, making it possible to tailor performance for specific applications. In a particular example, an adaptive current limiter solution using control circuitry emulating BJT 414, capacitor 422, resistor 424, zener diode 426, resistors 410, 412, 416 and 418, sense resistor 420 and FET 428 can be produced in the same package. In some instances, sense resistor 420 is external, and one or more sense resistors 420 having different resistance values are utilized together with the adaptive current limiter 308. In such an instance, the value of the sense resistor 420 is selectable to control the particular current level. In a particular example, the FET 428 and sense resistor 420 can be designed for use with particular power ranges.

In another embodiment, the FET 428 and sense resistor 420 can be implemented monolithically using a sense FET (SENSEFET) to monitor the current flow. Further, from a product standpoint, a higher level of integration is possible. The four-diode rectifier bridge formed from diodes 222, 224, 226, and 228 could be included in the same package as the adaptive current limiter 308, providing a compact single-part solution with four leads, which is advantageous for space constrained applications.

While the above discussion has focused on an adaptive current limiter 308 for limiting on-current peak amplitudes in dimming solutions for compact florescent and LED or solid-sate lighting solutions, it should be appreciated that adaptive current limiter 308 can be used for other functions. Further, adaptive current limiter 308 does not unduly interfere with operation of the system's operation when a TRIAC dimmer is not connected to the input, making it possible to incorporate the adaptive current limiter 308 in EMI filters, for example, for use within a light socket. When such devices are used without a dimmer, the adaptive current limiter 308 dissipates a small amount of power, mainly due to the sense resistor 420 and does not interfere with system function. Further, adaptive current limiter 308 can be used with forward or trailing edge type dimmers. Thus, adaptive current limiter 308 can be used with or without an external dimmer circuit.

In conjunction with the systems and techniques described above with respect to FIGS. 3-5, an adaptive current limiter controllably adjusts a current limit as a function of time and as a function of a feedback current, limiting a peak current flow and allowing EMI circuitry to charge based on the controlled current. By limiting the peak turn-on current spike, oscillating currents within the EMI filter are substantially eliminated and power consumption due to current surges is reduced. Further, because the adaptive current limiter is configured to limit the peak current independent of the input current, providing time for the EMI filter components to charge, adaptive current limiter can be used to adapt different types of phase-cut dimmers to work with various types of lamps, including compact florescent, LED bulbs, and other solid-state lamps, reducing ringing and flickering. In particular, by using the feedback current, adaptive current limiter circuit adjusts the current limit as a function of the current drawn by the load and not based on the input voltage.

Although the present invention has been described with reference to preferred embodiments, workers skilled in the art will recognize that changes may be made in form and detail without departing from the scope of the invention.

What is claimed is:

1. An adaptive current limiter for use in a power conversion system having a dimmer circuit for turning off a cyclic signal during a portion of a phase thereof to form a phase-cut signal, comprising:
    a sense resistor including a first sense terminal coupled to a power supply terminal and a second sense terminal, the sense resistor to generate a sense voltage in response to a feedback current;
    a current pass transistor including a first terminal for receiving an input current, a second terminal coupled to the second sense terminal, and a control terminal; and
    a controller coupled to the sense resistor and to the control terminal, the controller for sensing a beginning of a turn-on phase of the phase-cut signal, and responsive to the sensing for limiting the feedback current conducted by the current pass transistor during the beginning of the turn-on phase of the phase-cut signal.

2. The adaptive current limiter of claim 1, wherein the controller comprises a reference generator responsive to the sense voltage to generate a time-varying voltage signal during the beginning of the turn-on phase of the phase-cut signal.

3. The adaptive current limiter of claim 1, wherein the controller increases the feedback current conducted by the current pass transistor from a first current level to a second current level over a pre-determined period of time.

4. The adaptive current limiter of claim 1, wherein the current pass transistor comprises:
    a field effect transistor including a first current electrode for receiving the feedback current, a control electrode coupled to the controller, and a second current electrode coupled to the sense resistor.

5. The adaptive current limiter of claim 2, wherein the time-varying voltage signal comprises a ramp signal that increases substantially linearly during the beginning of the turn-on phase of the phase-cut signal.

6. The adaptive current limiter of claim 2, wherein the controller further comprises:
    an amplifier including a first input coupled to the sense resistor to receive the sense voltage, a second input coupled to the reference generator to receive the time-varying voltage signal, and an output coupled to the control terminal of the current pass transistor.

7. The adaptive current limiter of claim 4, wherein the controller comprises:
    a second transistor including a first current electrode coupled to the control electrode of the field effect transistor, a control electrode, and a second current electrode coupled to the power supply terminal;
    a first resistor including a first terminal coupled to the second sense terminal and a second terminal coupled to the control electrode of the second transistor;
    a second resistor including a first terminal coupled to the control terminal of the second transistor and a second terminal coupled to the power supply terminal; and
    a third resistor including a first terminal coupled to the second sense terminal and a second terminal; and
    a capacitor including a first electrode coupled to the second terminal of the third resistor and a second electrode coupled to the control terminal of the second transistor.

8. The adaptive current limiter of claim 2, wherein the time-varying voltage signal comprises a ramp signal that increases substantially exponentially during the beginning of the turn-on phase of the phase-cut signal.

9. The adaptive current limiter of claim 7, wherein the third resistor and the capacitor determine a time-varying current limit.

10. A current limiter circuit for use in a power conversion system having a dimmer circuit for turning off a cyclic signal during a portion of a phase thereof to form a phase-cut signal, comprising:
    a current pass transistor including a first current electrode adapted to couple to a load circuit to receive a feedback current, a second current electrode, and a control electrode;
    a sense resistor including a first sense terminal adapted to couple to a power supply terminal and a second sense terminal coupled to the second current electrode of the current pass transistor, the sense resistor for generating a sense voltage proportional to the feedback current; and
    a controller coupled to the sense resistor and to the control electrode, the controller for sensing a beginning of a turn-on phase of the phase-cut signal and responsive to the sensing to controllably increase a current conducted by the current pass transistor at the beginning of the turn-on phase of the phase-cut signal.

11. The current limiter circuit of claim 10, wherein the controller comprises:
    a reference generator responsive to the sense voltage to generate a time-varying voltage signal during the beginning of the turn-on phase of the phase-cut signal; and
    an amplifier including a first input for receiving the time-varying signal, a second input for receiving the sense voltage, and an output coupled to the control electrode of the current pass transistor.

12. The current limiter circuit of claim 10, further comprising:
    a first resistor including a first terminal coupled to the second sense terminal and including a second terminal;

a capacitor including a first electrode coupled to the second terminal of the first resistor and a second electrode; and a second transistor including a first terminal coupled to the control electrode of the current pass transistor, a control terminal coupled to the second electrode of the capacitor, and a second terminal coupled to the first sense terminal of the sense resistor; and whereby the first resistor and the capacitor define a time constant for limiting the current conducted by the current pass transistor.

13. The current limiter circuit of claim 10, further comprising:

a breakdown diode including an anode coupled to the second sense terminal of the sense resistor and a cathode coupled to the control electrode of the current pass transistor, the breakdown diode adapted to conduct current from the cathode to the anode when a voltage potential between the control electrode and the second current electrode of the current pass transistor exceeds a breakdown voltage off the breakdown diode.

14. The current limiter circuit of claim 12, wherein the controller further comprises:

a second resistor including a first terminal coupled to the second sense terminal of the sense resistor and including a second terminal coupled to the control terminal of the transistor; and a third resistor including a first terminal coupled to the control terminal of the transistor and including a second terminal coupled to the first sense terminal of the sense resistor and to the second terminal of the transistor.

15. A phase-cut dimmer system comprising:

first and second supply terminals;

a phase-cut dimmer circuit adapted to be coupled to an alternating current (AC) power supply for generating a phase-cut signal by turning off the AC power supply during a portion of a phase thereof;

a full-wave rectifier coupled to the phase-cut dimmer circuit for generating a rectified version of the phase-cut signal, the full-wave rectifier coupled to the first and second supply terminals for providing a rectified power supply;

an electromagnetic interference (EMI) filter coupled to the first and second supply terminals; and a current limiter circuit coupled to the second supply terminal and to the EMI filter, the current limiter circuit responsive to a feedback current to sense a beginning of a turn-on phase of a phase-cut signal and responsive to the sensing to adjust the feedback current at the beginning of the turn-on phase of the phase-cut signal.

16. The phase-cut dimmer system of claim 15, wherein the current limiter circuit increases the feedback current substantially linearly over the the beginning of the turn-on phase of the phase-cut signal.

17. The phase-cut dimmer system of claim 15, wherein the current limiter circuit comprises:

a reference generator responsive to a sense voltage to generate a time-varying voltage signal during the beginning of the turn-on phase of the phase-cut signal;

a sense resistor for converting the feedback current into the sense voltage;

an amplifier responsive to the time-varying signal and the sense voltage to produce a time-varying control signal; and a current pass transistor including a first terminal for receiving the feedback current, a second terminal coupled to the sense resistor, and a control terminal coupled to the amplifier and responsive to the control signal for limiting the feedback current.

18. The phase-cut dimmer system of claim 15, wherein the current limiter circuit comprises:

a first transistor including a first current electrode for receiving an input current, a second current electrode, and a control electrode;

a bias circuit including a first terminal coupled to the first supply terminal and a second terminal coupled to the control electrode of the first transistor;

a second transistor including a first current electrode coupled to the control electrode of the first transistor, a control electrode for receiving a time-varying signal, and a second current electrode coupled to the second supply terminal;

a sense resistor including a first sense terminal coupled to the second current electrode of the first transistor and a second sense terminal coupled to the second supply terminal;

a first resistor including a first terminal coupled to the second sense terminal and a second terminal coupled to the control electrode of the second transistor;

a second resistor including a first terminal coupled to the control electrode of the second transistor and a second terminal coupled to the second current electrode of the second transistor; and a signal generator coupled between the second sense terminal of the sense resistor and the control electrode of the second transistor for providing the time-varying signal.

19. The phase-cut dimmer system of claim 15, further comprising:

first and second output terminals coupled to the EMI filter;

an isolation circuit including a first terminal coupled to the first output terminal and a second terminal coupled to the second output terminal, the isolation circuit adapted to be coupled to a load circuit; and wherein the load circuit comprises one of a light-emitting diode (LED) lamp, a compact florescent lamp, and a motor.

20. The phase-cut dimmer system of claim 18, wherein the signal generator comprises:

a third resistor including a first terminal coupled to the second sense terminal of the sense resistor and a second terminal; and a capacitor including a first electrode coupled to the second terminal of the third resistor and a second electrode coupled to the control electrode of the second transistor.

* * * * *